United States Patent
Ahn (10) Patent No.: US 9,864,983 B2
(45) Date of Patent: Jan. 9, 2018

(54) PAYMENT METHOD, PAYMENT SERVER PERFORMING THE SAME AND PAYMENT SYSTEM PERFORMING THE SAME

(71) Applicant: LG CNS CO., LTD., Seoul (KR)

(72) Inventor: Tae Hoon Ahn, Seoul (KR)

(73) Assignee: LG CNS CO., LTD., Seoul (KR)

( * ) Notice: Subject to any disclaimer, the term of this patent is extended or adjusted under 35 U.S.C. 154(b) by 771 days.

(21) Appl. No.: 14/027,059

(22) Filed: Sep. 13, 2013

(65) Prior Publication Data

US 2014/0081784 A1   Mar. 20, 2014

(30) Foreign Application Priority Data

Sep. 14, 2012  (KR) .......................... 10-2012-0102486

(51) Int. Cl.
| | |
|---|---|
| *G06G 1/12* | (2006.01) |
| *G06Q 40/00* | (2012.01) |
| *G06Q 20/32* | (2012.01) |
| *G06Q 20/42* | (2012.01) |
| *G06Q 20/38* | (2012.01) |

(52) U.S. Cl.
CPC ......... *G06Q 20/322* (2013.01); *G06Q 20/382* (2013.01); *G06Q 20/385* (2013.01); *G06Q 20/42* (2013.01)

(58) Field of Classification Search
USPC ......................................................... 705/21
See application file for complete search history.

(56) References Cited

U.S. PATENT DOCUMENTS

| | | | | |
|---|---|---|---|---|
| 5,969,324 A * | 10/1999 | Reber | .................... | G06Q 10/00 235/383 |
| 8,151,345 B1 * | 4/2012 | Yeager | ................. | G06Q 20/367 235/375 |
| 8,266,438 B2 * | 9/2012 | Orsini | ................... | G06F 21/606 380/286 |
| 8,381,969 B1 * | 2/2013 | Miller | ................. | G06Q 20/382 235/375 |
| 8,565,723 B2 * | 10/2013 | Cox | ........................ | G06F 21/31 455/410 |

(Continued)

FOREIGN PATENT DOCUMENTS

| | | |
|---|---|---|
| JP | 2001-344545 | 12/2001 |
| JP | 2005-522775 | 7/2005 |

(Continued)

OTHER PUBLICATIONS

Japan Patent Office Application No. 2012-247793, Office Action dated Jan. 9, 2014, 4 pages.

(Continued)

*Primary Examiner* — Ashford S Hayles
(74) *Attorney, Agent, or Firm* — Lee Hong Degerman Kang & Waimey (57) ABSTRACT

A payment server that includes a payment request receiving unit configured to receive a payment request code including a first partial payment code, and a payment code determination unit configured to determine a second partial payment code based on the received payment request code. The payment server also includes a payment code generation unit configured to generate a payment code based on the first and second partial payment codes, the payment code being payable by a user.

15 Claims, 8 Drawing Sheets

(56) References Cited

U.S. PATENT DOCUMENTS

| | | | | |
|---|---|---|---|---|
| 8,615,468 B2* | 12/2013 | Varadarajan | G06Q 20/04 | 235/379 |
| 8,769,288 B2* | 7/2014 | Sundaram | H04L 9/0894 | 380/277 |
| 8,789,154 B2* | 7/2014 | Li | H04L 63/0428 | 726/6 |
| 8,838,973 B1* | 9/2014 | Yung | H04L 63/0838 | 713/165 |
| 8,997,184 B2* | 3/2015 | Vellozo Luz | G06F 21/606 | 235/381 |
| 9,065,643 B2* | 6/2015 | Hurry | G06Q 20/3829 | |
| 9,292,670 B2* | 3/2016 | Gupta | G06F 21/31 | |
| 2001/0034717 A1 | 10/2001 | Whitworth | G06Q 20/341 | 705/64 |
| 2001/0051915 A1* | 12/2001 | Ueno | G06Q 20/04 | 705/39 |
| 2001/0056409 A1* | 12/2001 | Bellovin | G06Q 20/04 | 705/64 |
| 2002/0029342 A1* | 3/2002 | Keech | G06Q 20/02 | 713/184 |
| 2002/0060246 A1* | 5/2002 | Gobburu | G06Q 20/04 | 235/462.46 |
| 2002/0152241 A1* | 10/2002 | Hepworth | G06F 3/0481 | 715/244 |
| 2003/0121969 A1* | 7/2003 | Wankmueller | G06K 19/10 | 235/379 |
| 2004/0148253 A1* | 7/2004 | Shin | G06Q 20/04 | 705/39 |
| 2004/0210449 A1* | 10/2004 | Breck | G06Q 10/04 | 705/39 |
| 2004/0260646 A1* | 12/2004 | Berardi | G06Q 20/00 | 705/39 |
| 2005/0211763 A1* | 9/2005 | Sgambati | G06Q 40/00 | 235/379 |
| 2007/0022058 A1* | 1/2007 | Labrou | G06Q 20/32 | 705/67 |
| 2008/0195536 A1* | 8/2008 | Karns | G06Q 20/10 | 705/39 |
| 2008/0210754 A1* | 9/2008 | Lovett | G06Q 20/24 | 235/380 |
| 2008/0262973 A1* | 10/2008 | Johnson | G06Q 20/401 | 705/75 |
| 2008/0313081 A1* | 12/2008 | Wee | G06Q 20/12 | 705/44 |
| 2009/0057393 A1* | 3/2009 | Merkow | G06Q 20/105 | 235/379 |
| 2009/0172402 A1* | 7/2009 | Tran | G06Q 20/102 | 713/170 |
| 2009/0182634 A1* | 7/2009 | Park | G06Q 20/20 | 705/14.36 |
| 2009/0235339 A1* | 9/2009 | Mennes | G06F 21/33 | 726/5 |
| 2009/0254479 A1* | 10/2009 | Pharris | G06Q 20/102 | 705/42 |
| 2009/0276347 A1* | 11/2009 | Kargman | G06Q 20/32 | 705/35 |
| 2009/0294539 A1* | 12/2009 | Kim | G06F 17/30879 | 235/462.01 |
| 2010/0125508 A1* | 5/2010 | Smith | G06Q 20/10 | 705/16 |
| 2010/0125509 A1* | 5/2010 | Kranzley | G06Q 20/20 | 705/17 |
| 2010/0127083 A1* | 5/2010 | Brown | G07F 7/0806 | 235/492 |
| 2010/0175120 A1* | 7/2010 | Tien | H04L 63/0853 | 726/9 |
| 2010/0180328 A1* | 7/2010 | Moas | G06F 21/34 | 726/6 |
| 2010/0185545 A1* | 7/2010 | Royyuru | G06Q 20/04 | 705/67 |
| 2010/0187303 A1* | 7/2010 | Eckert | G06Q 20/204 | 235/380 |
| 2010/0235283 A1* | 9/2010 | Gerson | G06Q 20/1085 | 705/75 |
| 2010/0257254 A1* | 10/2010 | Bhatnagar | G06Q 20/0457 | 709/219 |
| 2010/0262546 A1* | 10/2010 | Sahota | G06Q 20/10 | 705/75 |
| 2011/0022835 A1* | 1/2011 | Schibuk | G06Q 20/382 | 713/153 |
| 2011/0113237 A1* | 5/2011 | Hird | G06F 21/34 | 713/155 |
| 2011/0113245 A1* | 5/2011 | Varadarajan | G06F 21/34 | 713/168 |
| 2011/0153496 A1* | 6/2011 | Royyuru | G06Q 20/12 | 705/44 |
| 2011/0178927 A1* | 7/2011 | Lindelsee | G06Q 20/40 | 705/44 |
| 2011/0191236 A1* | 8/2011 | Cummings | G06Q 20/10 | 705/39 |
| 2011/0191248 A1* | 8/2011 | Bishop | G06Q 20/027 | 705/67 |
| 2011/0225417 A1* | 9/2011 | Maharajh | G06F 21/10 | 713/150 |
| 2011/0231315 A1* | 9/2011 | Bandyopadhyay | G06Q 20/10 | 705/44 |
| 2011/0247062 A1* | 10/2011 | Zon | H04L 9/3226 | 726/6 |
| 2011/0251892 A1* | 10/2011 | Laracey | G06Q 30/0253 | 705/14.51 |
| 2011/0270751 A1* | 11/2011 | Csinger | G06F 21/40 | 705/42 |
| 2012/0054046 A1* | 3/2012 | Albisu | G06Q 20/20 | 705/16 |
| 2012/0067944 A1* | 3/2012 | Ross | G06K 7/1095 | 235/375 |
| 2012/0101887 A1* | 4/2012 | Harvey | G06Q 10/00 | 705/14.23 |
| 2012/0130889 A1* | 5/2012 | Lyons | G06Q 20/3272 | 705/39 |
| 2012/0132706 A1* | 5/2012 | McKenzie | G06Q 10/04 | 235/380 |
| 2012/0138679 A1* | 6/2012 | Doyle | G06K 19/06037 | 235/380 |
| 2012/0158593 A1* | 6/2012 | Garfinkle | G06Q 20/382 | 705/64 |
| 2012/0173431 A1* | 7/2012 | Ritchie | G06Q 20/367 | 705/65 |
| 2012/0191611 A1* | 7/2012 | Kelly | G06Q 20/382 | 705/64 |
| 2012/0191613 A1* | 7/2012 | Forbes | G06Q 20/20 | 705/67 |
| 2012/0203697 A1* | 8/2012 | Morgan | G06Q 20/3276 | 705/44 |
| 2012/0211561 A1* | 8/2012 | Lieberman | G06Q 40/123 | 235/383 |
| 2012/0245985 A1* | 9/2012 | Cho | G06Q 20/16 | 705/14.23 |
| 2012/0266224 A1* | 10/2012 | Gruschka | G06F 21/35 | 726/7 |
| 2012/0310827 A1* | 12/2012 | Gibson, III | G06Q 20/10 | 705/42 |
| 2013/0060688 A1* | 3/2013 | Hurst | G06Q 30/06 | 705/41 |
| 2013/0110676 A1* | 5/2013 | Kobres | G06Q 20/20 | 705/26.41 |
| 2013/0124412 A1* | 5/2013 | Itwaru | G06Q 20/322 | 705/44 |
| 2013/0124855 A1* | 5/2013 | Varadarajan | G06Q 20/3276 | 713/155 |
| 2013/0126619 A1* | 5/2013 | Del Fiume | H04L 9/3247 | 235/492 |
| 2013/0159178 A1* | 6/2013 | Colon | G06Q 20/36 | 705/41 |
| 2013/0159186 A1* | 6/2013 | Brudnicki | G06Q 20/227 | 705/44 |
| 2013/0179692 A1* | 7/2013 | Tolba | H04L 63/08 | 713/179 |

(56) References Cited

U.S. PATENT DOCUMENTS

| | | | | |
|---|---|---|---|---|
| 2013/0206834 A1* | 8/2013 | Itwaru | G06Q 40/02 | 235/379 |
| 2013/0212004 A1* | 8/2013 | Itwaru | G06Q 50/01 | 705/39 |
| 2013/0282582 A1* | 10/2013 | Pereira | G06Q 20/12 | 705/44 |
| 2013/0282588 A1* | 10/2013 | Hruska | G06Q 20/10 | 705/67 |
| 2013/0282590 A1* | 10/2013 | Rajarethnam | G06Q 20/3276 | 705/71 |
| 2013/0311768 A1* | 11/2013 | Fosmark | G06Q 20/3223 | 713/155 |
| 2013/0340071 A1* | 12/2013 | Vellozo Luz | G06F 21/36 | 726/18 |
| 2014/0012412 A1* | 1/2014 | Khonalkar | G07F 11/002 | 700/237 |
| 2014/0019358 A1* | 1/2014 | Priebatsch | G06Q 20/322 | 705/44 |
| 2014/0020073 A1* | 1/2014 | Ronda | G06F 21/31 | 726/7 |
| 2014/0037074 A1* | 2/2014 | Bravo | H04W 12/06 | 379/88.01 |
| 2014/0040147 A1* | 2/2014 | Varadarajan | H04L 63/0853 | 705/71 |
| 2014/0067674 A1* | 3/2014 | Leyva | G06Q 20/20 | 705/44 |
| 2014/0074637 A1* | 3/2014 | Hammad | G06Q 20/12 | 705/21 |
| 2016/0132871 A1* | 5/2016 | Bobrovnikoff | G06Q 20/28 | 705/71 |

FOREIGN PATENT DOCUMENTS

| | | |
|---|---|---|
| JP | 2011-053931 | 3/2011 |
| KR | 10-2010-0001798 | 1/2010 |
| KR | 10-2012-0019964 | 3/2012 |

OTHER PUBLICATIONS

Korean Intellectual Property Office Application Serial No. 10-2012-0102486, Office Action dated Jan. 29, 2014, 6 pages.

* cited by examiner

1. TIME-SYNC METHOD - 20BIT BARCODE

2. TIME-SYNC METHOD - 24BIT BARCODE

3. EVENT & TIME-SYNC METHOD - 24BIT BARCODE

US 9,864,983 B2

PAYMENT METHOD, PAYMENT SERVER PERFORMING THE SAME AND PAYMENT SYSTEM PERFORMING THE SAME

CROSS-REFERENCE TO RELATED APPLICATIONS

Pursuant to 35 U.S.C. §119(a), this application claims the benefit of earlier filing date and right of priority to Korean Patent Application Nos. 10-2012-0102486, filed on Sep. 14, 2012, the contents of which are hereby incorporated by reference herein in their entirety.

FIELD OF THE INVENTION

The present invention relates to a payment technology, and more particularly to a payment method, a payment server and a payment system using a one-time authentication code.

DISCUSSION OF THE RELATED ART

A mobile terminal stores payment information for payment processing or the payment information into a payment server. Such payment information may generate problems due to a malignant code, a loss of the mobile terminal, and hacking of the payment server. For example, the mobile terminal may use a barcode indicating the payment information to perform an offline payment and the barcode may be wrongfully exposed when the barcode is screen captured. The barcode may be stored in the mobile terminal or may be downloaded from a payment server.

Korean Patent Laid Open Publication No. 10-2006-0132763 relates to a One-Time Password (OTP) barcode authentication system and method and this technology generates a barcode including an OTP code and personal information in real time to use the generated barcode as personal authentication and payment means.

Korean Patent Laid Open Publication No. 10-2008-0124020 relates to a method and system for generating and authenticating credit service information for an integrated credit service and this technology utilizes a plurality of credit services through a single network without constructing an individual network per credit service.

SUMMARY

A payment technology may use a OTP code in a payment request code and may further store a first partial payment code in a user terminal to strengthen a user authentication.

A payment technology may also distribute and store first and second OTP codes into a user terminal and a payment server to strengthen a user authentication.

A payment technology may further concatenate and encrypt first and second partial payment codes to strengthen a user authentication.

In some cases, a payment technology may pre-verify a payment code through a payment authority before payment processing to strengthen a user authentication.

A payment server includes a payment request receiving unit configured to receive a payment request code including a first partial payment code, a payment code determination unit configured to determine a second partial payment code based on the received payment request code and a payment code generation unit configured to generate a payment code based on the first and second partial payment codes, the payment code being payable by a user.

The payment request code may include at least one of a one-dimensional bar code, a two-dimensional bar code or a Quick Response (QR) code.

The payment code generation unit may perform a decrypting operation on a first encrypted partial payment code, the first encrypted partial payment code being encrypted by a user terminal through a re-arrangement operation or a masking operation on the first partial payment code and the payment code generation unit may concatenate the decrypted first partial payment code and the second partial payment code to generate the payment code.

The generated payment code may correspond to a payment code in a credit card, a smart card, a debit card, or a prepaid card.

The payment server may further include a certification unit configured to receive a first one-time code before the payment request code is received to certify the user. The certification unit may use the first one-time code to generate a second one-time code related to a payment and may transmit the generated second one-time code to the user terminal to cause the user terminal to certify the payment server. The certification unit may transmit a payment identifier to the user terminal.

The payment request code may further include a second one-time code and a payment identifier related with a payment.

The payment server may further include a payment processing unit configured to perform a payment processing on transaction information through a payment authority based on the generated payment code. The payment processing unit may compare a certification value received from the user terminal and a pre-stored certification value to self-verify the generated payment code before the payment processing through the payment authority. The payment processing unit may transmit a result of the payment processing to a user terminal independently of the payment authority.

In some embodiments, the payment method performed in a payment server includes receiving a payment request code including a first partial payment code, determining a second partial payment code based on the received payment request code and generating a payment code based on the first and second partial payment codes, the payment code being payable by a user.

The payment request code may include at least one of a one-dimensional bar code, a two-dimensional bar code, or a QR code.

Generating a payment code may include performing a decrypting operation on a first encrypted partial payment code, the first encrypted partial payment code being encrypted by a user terminal through a re-arrangement operation or a masking operation on the first partial payment code and concatenating the decrypted first partial payment code and the second partial payment code to generate the payment code. The generated payment code may correspond to a payment code in a credit card, a smart card, a debit card, or a prepaid card.

The payment method may further include receiving a first one-time code before the payment request code is received to certify the user. Receiving the first one-time code may include generating a second one-time code related to a payment and transmitting the generated second one-time code to the user terminal to cause the user terminal to certify the payment server. Transmitting the generated second one-time code may include transmitting a payment identifier to the user terminal.

In some embodiments, the payment method may further include performing a payment processing on payment information through a payment authority based on the generated payment code. Performing the payment processing may include comparing a certification value received from the user terminal and a pre-stored certification value to autonomously verify the generated payment code before the payment processing through the payment authority. Performing the payment processing may include transmitting a result of the payment processing to user terminal independently of the payment authority.

In some embodiments, a storage medium storing a program for performing a payment method performed in a payment server includes a function of receiving a payment request code including a first partial payment code, a function of determining a second partial payment code based on the received payment request code and a function of generating a payment code based on the first and second partial payment codes, the payment code being payable by a user.

In some embodiments, a payment system includes a user terminal configured to generate a payment request code including a first partial payment code to transmit the payment request code and a payment server configured to receive the payment request code, to determine a second partial payment code based on the payment request code and to generate a payment code payable by a user based on the first and second partial payment codes.

The payment system may further include a point-of-sale (POS) terminal configured to receive the payment request code from the user terminal to transmit the received payment request code to the payment server.

The payment system may further include a value-added-network (VAN) terminal configured to provide the payment request code received from the POS terminal to the payment server.

The user terminal may perform at least one specific operation on the first partial payment code, the specific operation including a re-arrangement operation or a masking operation. The payment server may perform a decrypting operation on the first partial payment code where the at least one specific operation is performed.

DETAILED DESCRIPTION

Explanation of the present invention is presented using assorted embodiments for structural or functional explanation, so the scope of the present invention should not be construed to be limited to the embodiments presented herein. That is, since the embodiments may be implemented in several forms without departing from the characteristics thereof, it should also be understood that the described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Terms described in the present disclosure may be understood as follows.

While terms such as "first" and "second," etc. may be used to describe various components, such components must not be understood as being limited to the above terms. The above terms are typically used only to distinguish one component from another. For example, a first component may be referred to as a second component without departing from the scope of rights of the present invention, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "between", "immediately between" or "adjacent to" and "directly adjacent to" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective steps or operations are used for the sake of explanation and do not describe any particular order of respective steps. The respective steps may be changed from a mentioned order unless specifically mentioned in context. Namely, respective steps may be performed in the same order as described, may be substantially simultaneously performed, or may be performed in reverse order.

In describing the elements of the present invention, terms such as first, second, A, B, (a), (b), etc., may be used. Such terms are used for merely discriminating the corresponding elements from other elements and the corresponding elements are not limited in their essence, sequence, or precedence by the terms.

In embodiments of the present invention, various methods may be implemented as codes that can be read by a processor in a program-recorded non-transitory medium. The processor-readable medium may include any types of recording apparatus in which data that can be read by a computer system is stored. The processor-readable medium may include a ROM, a RAM, a CD-ROM, a magnetic tape, a floppy disk, an optical data storage apparatus, and the like.

The processor-readable medium also includes implementations in the form of carrier waves or signals (e.g., transmission via the Internet). The computer-readable recording medium may be distributed over network-coupled computer systems so that the computer-readable code may be stored and executed in a distributed fashion.

The various methods presented herein are described using flowcharts having sequential steps or blocks, but such methods are not limited to the order of the steps and some of them may be performed using an order that is different from the order show or such steps may be performed simultaneously. Also, a skilled person in the art will understand that the steps are not exclusive but may include other steps, or one or more steps of the flowchart may be deleted without affecting the scope of the subject method.

The terms used in the present application are merely used to describe particular embodiments, and are not intended to limit the present invention. Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

Figure 1:
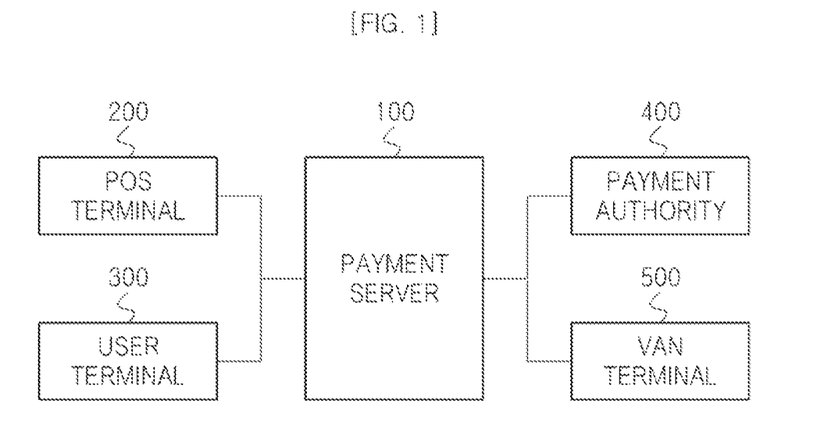
FIG. 1 is a block diagram illustrating a payment system according to an example embodiment of the present invention.

FIG. 1 is a block diagram illustrating a payment system according to an example embodiment of the present invention. Referring to FIG. 1, a payment system includes a payment server 100, a point-of-sale (POS) terminal 200, a user terminal 300, a payment authority 400 and a value-added-network (VAN) terminal 500.

The payment server 100 may correspond to a computing device that may perform a payment procedure according to a request of the user terminal 300. In one embodiment, when the payment server 100 receives a payment request code including a first partial payment code from the POS terminal 200, the payment server 100 may determine a second partial payment code based on the payment request code and generate a payment code based on the first and second partial payment codes.

The POS terminal 200 provides the payment request code directly to the payment server 100 or indirectly to the payment server, e.g., via the VAN terminal 500. For example, the payment request code may be implemented as a barcode or a QR code.

The user terminal 300 may correspond to a computing device that may perform a payment application. In one embodiment, the payment application respectively stores payment information, membership information and event coupon information. The payment application may use a code generation algorithm to generate the payment request code. As one example, the payment application may use an OTP generation algorithm to generate an OTP authentication code. For generating the OTP authentication code, the payment application may include at least one of transaction coupled authentication information, payment information, personal identification information, or payment means information.

The payment authority 400 may correspond to a computing device that may store a certified electronic document and may provide integrity, stability and reliability of an electronic document. For example, the payment authority 400 may be managed by a government or private agency such as a credit card company, a prepaid card company, a bank, a membership management company, or a telecommunication company. As another example, the payment authority 400 may be managed under e-commerce law. In one embodiment, the payment authority 400 performs payment processing when a payment request associated with a payment code is received from the payment server 100. In another embodiment, the payment authority 400 may perform verification processing when a verification request associated with a payment code is received from the payment server 100.

The VAN terminal 500 relays a payment procedure between the payment server 100 and the POS terminal 200. In one embodiment, the payment request code may further include a VAN code for a POS terminal authentication in the VAN terminal 500 and for a VAN terminal authentication in the payment server 100.

Figure 2:
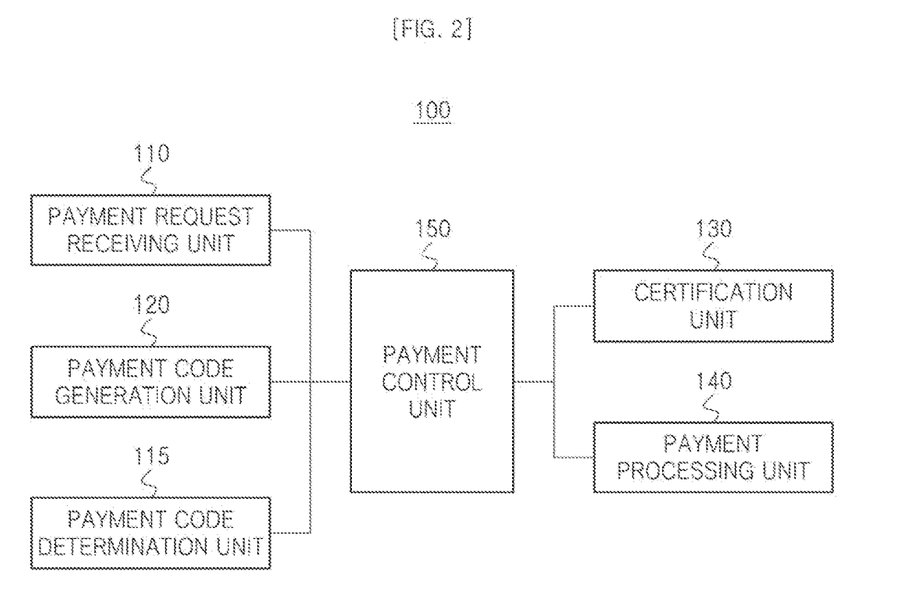
FIG. 2 is a block diagram illustrating one embodiment of the payment server of FIG. 1.

FIG. 2 is a block diagram illustrating one embodiment of the payment server in FIG. 1. Referring to FIG. 2, the payment server 100 includes a payment request receiving unit 110, a payment code determination unit 115 and a payment code generation unit 120 and may further include a certification unit 130 and a payment processing unit 140.

The payment request receiving unit 110 receives a payment request code including a first partial payment code. In one embodiment, the payment request code may include a user identifier. Herein, the user identifier may correspond to a user telephone number, a social security number, or partial payment information. As one example, the payment request receiving unit 110 may receive the payment request code displayed in the user terminal 300 through the POS terminal 200.

The payment code determination unit 115 determines a second partial payment code based on the payment request code. In one embodiment, when the payment request code includes the user identifier, the payment code determination unit 115 may determine the payment request code based on the user identifier.

The payment code generation unit 120 generates the payment code payable by a user based on the first and second partial payment codes. Herein, the first partial payment code may correspond to at least the user identifier and the second partial payment code may correspond to a remainder of the user identifier.

For example, when a card number as the user identifier corresponds to a value of 1234-5678-90XX-XXXX, the first partial payment code may correspond to a value of XX-XXXX and the second partial payment code may correspond to a value of 1234-5678-90. As another example, when a telephone number is used as the user identifier and corresponds to a value of 010-XXXX-1234, the first partial payment code may correspond to a value of XXXX and the second partial payment code may correspond to a value of 010-1234.

In one embodiment, the payment code generation unit 120 concatenates the first and second partial payment codes to generate a temporary payment code and performs at least one of a re-arrangement operation or a masking operation on the temporary payment code to generate the payment code. Herein, the payment code corresponds to a payment code in a credit card, a smartcard, a debit card, or a prepaid card. The payment code generation unit 120 decrypts the first partial payment code where the re-arrangement operation or the masking operation by the user terminal 200 is performed before such concatenation.

The certification unit 130 receives a first one-time code before the payment request code is received to certify the user. In one embodiment, when the certification of the user is successfully performed, the certification unit 130 transmits a second one-time code to the user terminal 300 to cause or permit the user terminal 300 to certify the payment server 100 and to generate the payment request code. In another embodiment, the certification unit 130 transmits a transaction identifier to the user terminal 300 to cause or permit the user terminal 300 to generate the payment request code including a transaction associated certification code.

The certification unit 130 certifies the user based on user information received from the user terminal 300. In one embodiment, the certification unit 130 may determine whether the user information corresponds to pre-stored user information. When the user information corresponds to the pre-stored user information, the certification unit 130 may successfully certify the user and when the user information does not correspond to the pre-stored user information, the certification unit 130 may unsuccessfully certify the user.

The payment processing unit 140 performs payment processing on transaction information through the payment authority 400 based on the payment code generated by the payment code generation unit 120. In one embodiment, the payment processing unit 140 may perform a self-verification on the generated payment code before transmitting the generated payment code to the payment authority 400. In some embodiments, the payment processing unit 140 may independently transmit the self-verification result to the payment authority 400.

Figure 3:
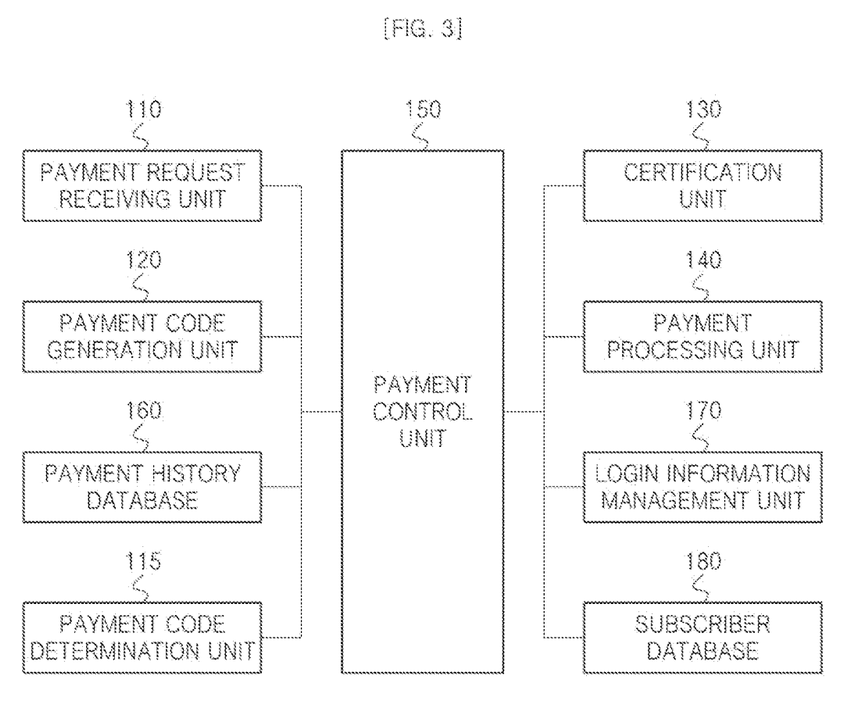
FIG. 3 is a block diagram illustrating another embodiment of the payment server of FIG. 1.

FIG. 3 is a block diagram illustrating another embodiment of a payment server in FIG. 1. In the embodiment of FIG. 3, items 110, 115, 120, 130 and 140 typically function in a manner that is similar to that as set out above in FIG. 2. Referring still to FIG. 3, in addition to the just-noted components, the payment server 100 may further include a payment history database 160, a login information management unit 170 and a subscriber database 180.

The payment history database 160 may store history information on a corresponding payment during payment processing. In one embodiment, the payment history database 160 may store the history information for each user and the history information may include a payment request time by the user.

The login information management unit 170 may manage the generation or deletion of the login information associated with the user accessing the payment server 100. The login information management unit 170 may generate corresponding login information when a generation request for the login information is received from the user. The login information management unit 170 may delete the corresponding login information when a deletion request for the login information is received from the user.

The subscriber database 180 stores user information of the user accessing the payment server 100. In one embodiment, the subscriber database 180 may store login information corresponding to a user allocated identifier. The login information may include a password, a social security number, a name and a birthday and the user allocated identifier may correspond to a user login identifier.

By way of example only, operation of the various payment systems and servers of FIGS. 1-3 will be described with reference to FIGS. 4 through 7.

Figure 4:
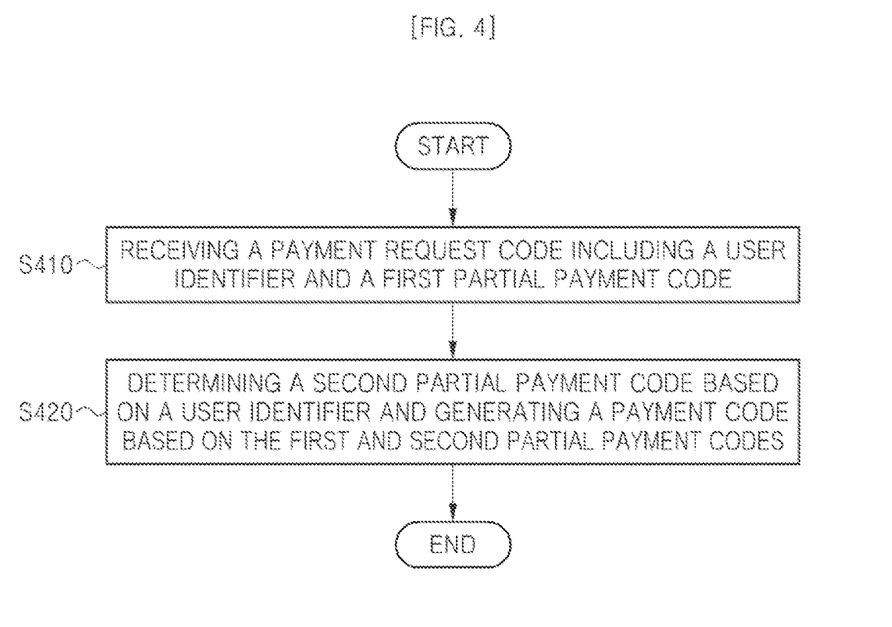
FIG. 4 is a flowchart illustrating one embodiment of operations of the payment system of FIG. 1.

FIG. 4 is a flowchart illustrating one embodiment of operations of the payment system of FIG. 1. In this example, the operations of FIG. 4 may be performed by the payment server 100 to generate payment code, but other systems may alternatively be used.

In FIG. 4, block S410 refers to receiving the payment request code that includes the first partial payment code. In one embodiment, the payment server 100, for example, may transmit the payment request code displayed in the user terminal 300 through the POS terminal 200. In another embodiment, when the payment request code received from the POS terminal 200 is encrypted, the payment server 100 may decrypt this payment request code. For example, when the first partial payment code is bit-shifted or bit-shuffled, the payment server 100 may decrypt the first partial payment code.

Block S420 includes determining the second partial payment code based on the payment request code, and generates the payment code payable by the user based on the first and second partial payment codes. Herein, a length of the first partial payment code may be less than that of the second partial payment code. In one embodiment, the payment server 100 may concatenate the first and second partial payment codes to generate the payment code.

Figure 5:
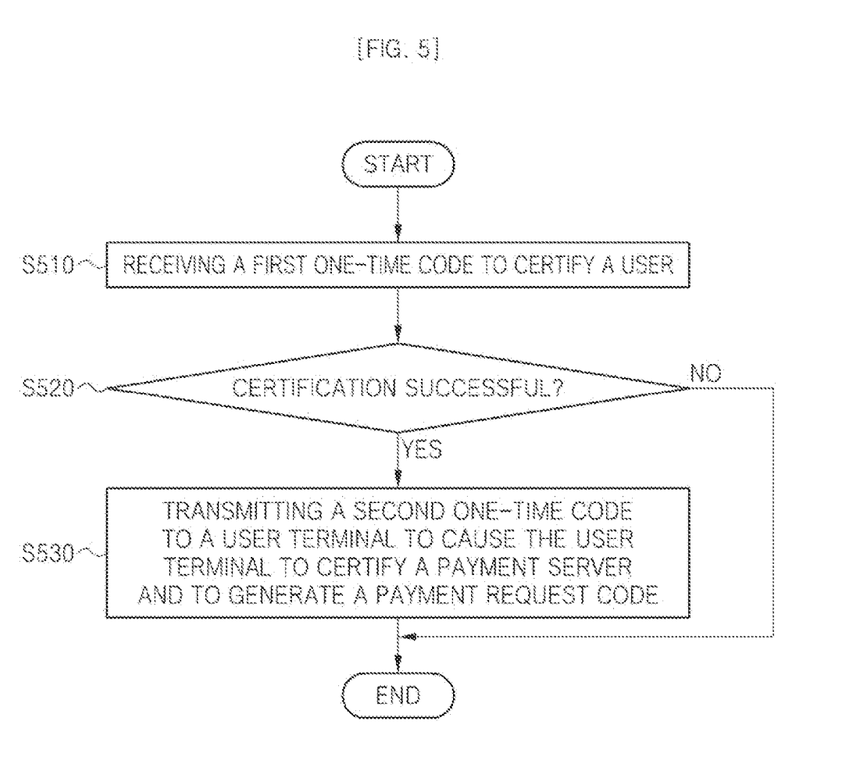
FIG. 5 is a flowchart illustrating another embodiment of operations of the payment system of FIG. 1.

FIG. 5 is a flowchart illustrating another embodiment of operations of the payment system of FIG. 1. In this example, the operations of FIG. 5 may be performed by the payment server 100 to receive and transmit codes, but other systems may alternatively be used. This payment mechanism may also alternatively include certifying the user terminal 300 before the payment request code is received.

In FIG. 5, block S510 includes receiving the first one-time code before the payment request code is received to certify the user. The first one-time code may be generated as a hash value based on a one-time code generation algorithm. In some situations, the first one-time code and personal identification number may both be received. Examples of a personal identification number include identifiers such a personal identifier, a telephone number, and the payment information.

Decision block S520 determines whether a user certification is successfully performed. If the certification is not successful, then the process may end. On the other hand, if the certification is successful, the process proceeds to block S530 for a transmitting operation. More specifically, block S530 refers to transmitting the second one-time code to the user terminal 300 to cause the user terminal 300 to certify the payment server 100 and to generate the payment request code. In one embodiment, block S530 may be implemented by transmitting a transaction identifier to the user terminal 300 to cause the user terminal 300 to generate the payment request code including a transaction associated certification code.

Figure 6:
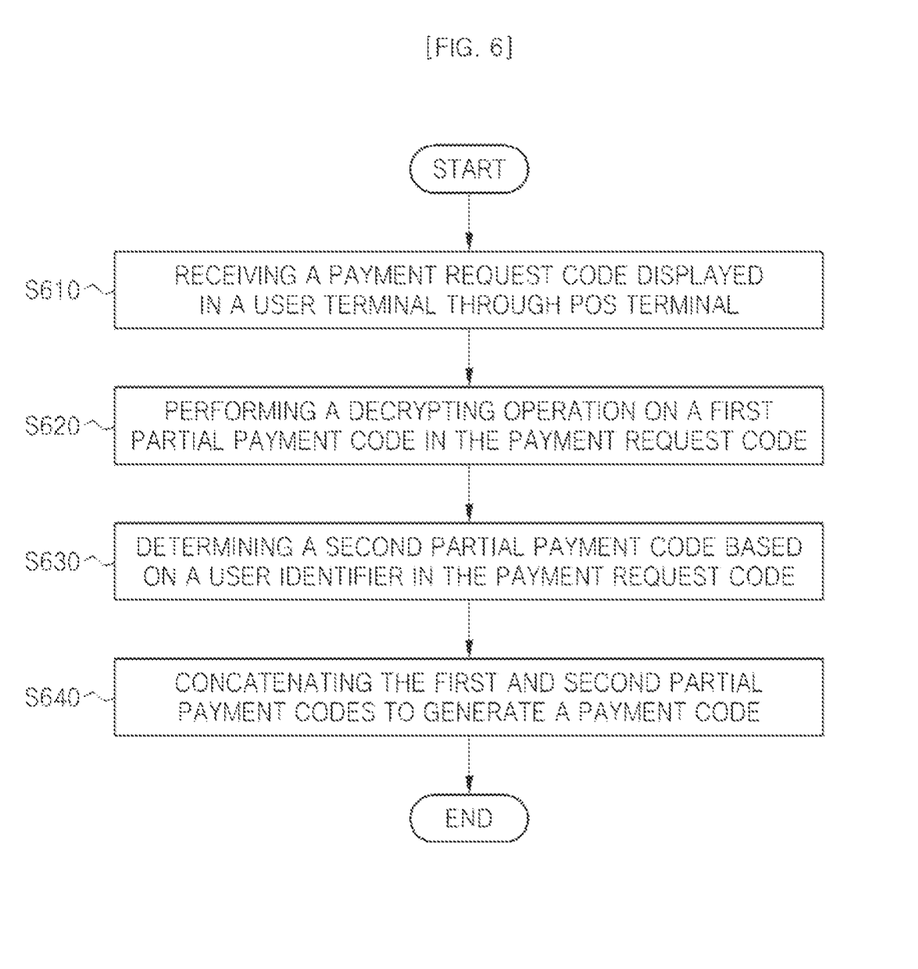
FIG. 6 is a flowchart illustrating still another embodiment of operations of the payment system of FIG. 1.

FIG. 6 is a flowchart illustrating still another embodiment of operations of the payment system of FIG. 1. In this example, the operations of FIG. 6 may be performed by the payment server 100 to generate payment code for payment server certification, but other systems may alternatively be used.

In FIG. 6, block S610 includes receiving the payment request code displayed in the user terminal 300 through the POS terminal 200. If desired, the payment request code, such as a barcode or a QR code displayed in the user terminal 300, may be displayed in a 2-dimensional or 3-dimensional view.

Block S620 performs a decrypting operation on the first partial payment code decrypted in the user terminal 200. For example, the first partial payment code may be generated though bit-shifting or bit-shuffling by the user terminal 300 and may be generated through bit-masking or bit-deleting by the user terminal 300. In one embodiment, the first partial payment code may be encrypted through the following Equation 1.

$$\text{Payment Code} = T\_code << Random(T\_code) \quad \text{Equation 1:}$$

Payment Code: the payment code

T_code: the temporary payment code

<<: Shift operation

Random( ): Function of randomly generating a maximum bit number of T_code (e.g., when the T_code is implemented as a byte size, an output range of Random( ) may be 0~8).

Block S630 determines the second partial payment code based on the payment request code, and then block S640 concatenates the first and second partial payment codes to generate the payment code.

Figure 7:
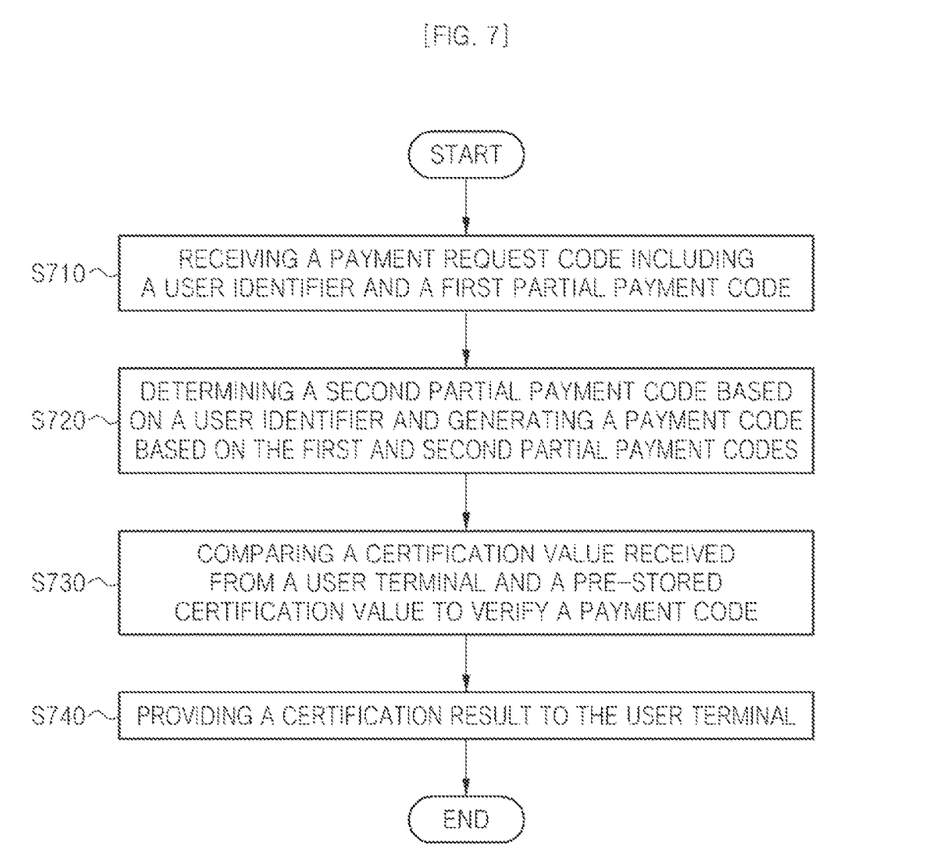
FIG. 7 is a flowchart illustrating still another embodiment of operations of the payment system of FIG. 1.

FIG. 7 is a flowchart illustrating still another embodiment of operations of the payment system of FIG. 1. In this example, the operations of FIG. 7 may be performed by the payment server 100 to generate payment code for payment authority certification, but other systems may alternatively be used.

In FIG. 7, block S710 receives the payment request code including the first partial payment code. In some cases, the payment request code may further include a user identifier. Block S720 determines the second partial payment code based on the payment request code and generates the payment code payable by the user based on the first and second partial payment codes.

Block S730 compares a first certification value received from the user terminal 300 and a second certification value to self-verify the payment code. The first certification value may be implemented as a one-time certification value or a transaction associated certification code and the certification value may be implemented as a pre-stored value.

According to block S740, when the self-verification is successful, the payment code may be certified through the payment authority 400, and such certification result may be provided to the user terminal 200.

Figure 8:
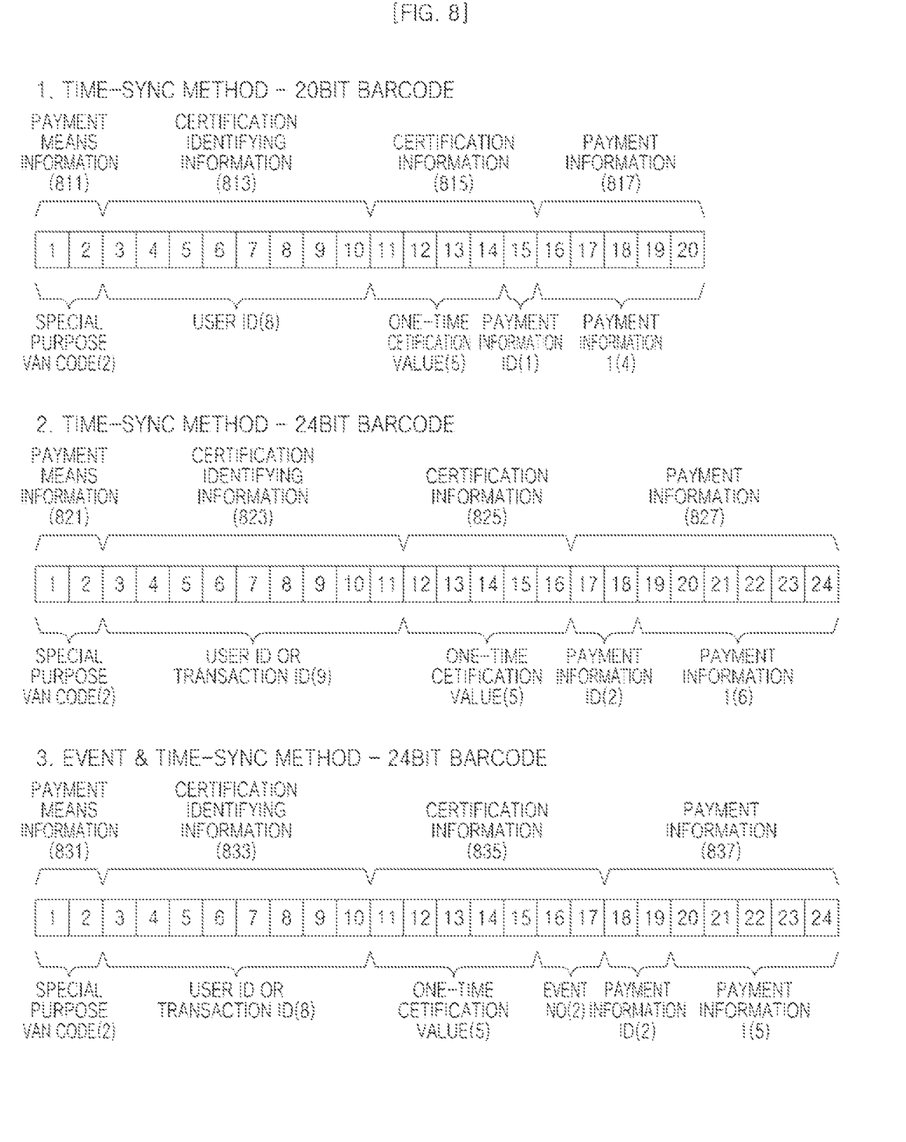
FIG. 8 is an example of payment codes generated in the payment system of FIG. 1.

FIG. 8 is an example of payment codes generated in the payment system in FIG. 1. In FIG. 8, a length of the payment code may be limited to a length readable by a barcode reader. Such payment code may include at least one of payment means information 811, 821 or 831, certification identifying information 813, 823 or 833, certification information 815, 825 or 835, or payment information 817, 827 or 837.

The payment means information 811, 821 or 831 may include a special purpose VAN code and the special purpose VAN code may be used in a convenience store, for example. The certification identifying information 813, 823 or 833 may include a user identifier in a payment approval or a transaction identifier in a payment cancellation. The certification information 815, 825 or 835 may include a transaction associated one-time certification code generated through an OTP algorithm, for example. Also, the certification information 815, 825 or 835 may further include an event number when the barcode is implemented in an event and time-sync way.

The payment information 817, 827 or 837 may include partial payment information separately stored in the user terminal 300. For example, the payment information 817, 827 or 837 may include a partial number of a credit card number, a telephone number, a bank account number, a membership identification number, or a prepaid card number. For example, consider the credit card number of a value of 1234-5678-90XX-XXXX, a value of XX-XXXX is stored in the user terminal 300 and a remainder is stored in the payment server 100. In the telephone number having a value of 010-1234-5678, a value of 1234 is stored in the user terminal 300 and a remainder is stored in the payment server 100. Also, an ID of the payment information 817, 827 or 837 may be stored in a barcode for matching payment information stored in the user terminal 300 with payment information in the payment server 100.

Although this document provides descriptions of preferred embodiments of the present invention, it would be understood by those skilled in the art that the present invention can be modified or changed in various ways without departing from the technical principles and scope defined by the appended claims.

DESCRIPTION OF REFERENCE NUMBERS

100: PAYMENT SERVER
200: POS TERMINAL
300: USER TERMINAL
400: PAYMENT AUTHORITY
110: PAYMENT REQUEST RECEIVING UNIT
120: PAYMENT CODE GENERATION UNIT
130: CERTIFICATION UNIT
140: PAYMENT PROCESSING UNIT
150: PAYMENT CONTROL UNIT
160: PAYMENT HISTORY DATABASE
170: LOGIN INFORMATION MANAGEMENT UNIT
180: SUBSCRIBER DATABASE

What is claimed is:

1. A server, comprising:
a certification unit configured to:
receive a first one-time code from a terminal of a user before a payment request code is submitted from the terminal of the user, the first one-time code is used to certify the user of the terminal;
certify the user of the terminal according to the first one-time code;
generate a second one-time code, after the certifying the user of the terminal;
transmit the generated second one-time code to the terminal after the certifying the user of the terminal, wherein the second one-time code permits the terminal to certify the server and to provide the payment request code;
a payment request receiving unit configured to receive the payment request code from the user, wherein the payment request code includes a first partial payment code;
a payment code determination unit configured to determine a second partial payment code based on the received payment request code, wherein the second partial payment code is a subset of code included in the payment request code and is different from the first partial payment code; and
a payment code generation unit configured to generate a payment code based on the first partial payment code and the second partial payment code, the payment code being payable by the user and to transmit the generated payment code to a payment authority.

2. The server of claim 1, wherein the payment request code includes at least one of a one-dimensional bar code, a two-dimensional bar code, or a Quick Response QR code.

3. The server of claim 1, wherein the payment code generation unit is further configured to:
decrypt a first encrypted partial payment code, the first encrypted partial payment code being encrypted by the terminal of the user through either re-arrangement or masking of the first partial payment code; and
concatenate the decrypted first partial payment code and the second partial payment code to generate the payment code.

4. The server of claim 3, wherein the generated payment code corresponds to a payment code in a credit card, a smart card, a debit card or a prepaid card.

5. The server of claim 1, further comprising:
a payment processing unit configured to perform payment processing on transaction information through the payment authority based on the generated payment code.

6. The server of claim 5, wherein the payment processing unit is further configured to:
compare a certification value received from the terminal of the user and a pre-stored certification value to self-verify the generated payment code before performing the payment processing through the payment authority.

7. The server of claim 6, wherein the payment processing unit is further configured to:
transmit a result of the payment processing to the terminal of the user independently of the payment authority.

8. A payment method performed at a server, the method comprising:
receiving a first one-time code from a terminal of a user before a payment request code is submitted from the terminal of the user, the first one-time code is used to certify the user of the terminal;
certifying the user of the terminal according to the first one-time code;
generating a second one-time code, after the certifying the user of the terminal;
transmitting the generated second one-time code to the terminal after the certifying the user of the terminal, wherein the second one-time code permits the terminal to certify the server and to provide the payment request code;
receiving the payment request code from the user, wherein the payment request code includes a first partial payment code;
determining a second partial payment code based on the received payment request code, wherein the second partial payment code is a subset of code included in the payment request code and is different from the first partial payment code;
generating a payment code based on the first partial payment code and the second partial payment code, the payment code being payable by the user; and
transmitting the generated payment code to a payment authority.

9. The method of claim 8, wherein the payment request code includes at least one of a one-dimensional bar code, a two-dimensional bar code, or a Quick Response (QR) code.

10. The method of claim 8, wherein the generating a payment code includes:
decrypting a first encrypted partial payment code, the first encrypted partial payment code being encrypted by the terminal of the user through re-arrangement or masking of the first partial payment code; and
concatenating the decrypted first partial payment code and the second partial payment code to generate the payment code.

11. The method of claim 10, wherein the generated payment code corresponds to a payment code of a credit card, a smart card, a debit card or a prepaid card.

12. The method of claim 8, further comprising:
performing payment processing on payment information through the payment authority based on the generated payment code.

13. The method of claim 12, wherein the performing the payment processing includes comparing a certification value received from the terminal of the user and a pre-stored certification value to autonomously verify the generated payment code before the payment processing through the payment authority.

14. The method of claim 13, wherein the performing the payment processing includes transmitting a result of the payment processing to the terminal of the user independently of the payment authority.

15. A machine-readable non-transitory medium having stored thereon machine-executable instructions for:
receiving a first one-time code from a terminal of a user before a payment request code is submitted from the terminal of the user, the first one-time code is used to certify the user of the terminal;
certifying the user of the terminal according to the first one-time code;
generating a second one-time code, after the certifying the user of the terminal;
transmitting the generated second one-time code to the terminal after the certifying the user of the terminal, wherein the second one-time code permits the terminal to certify the server and to provide the payment request code;
receiving the payment request code from the user, wherein the payment request code includes a first partial payment code;
determining a second partial payment code based on the received payment request code, wherein the second partial payment code is a subset of code included in the payment request code and is different from the first partial payment code;
generating a payment code based on the first partial payment code and the second partial payment code, the payment code being payable by user; and
transmitting the generated payment code to a payment authority.

* * * * *